United States Patent
Conlon et al.

(10) Patent No.: US 9,701,253 B2
(45) Date of Patent: Jul. 11, 2017

(54) ITEM-HOLDING DEVICE

(71) Applicant: LOULOU DESIGNS, INC., Marietta, GA (US)

(72) Inventors: Alison Louise Conlon, Marietta, GA (US); Andria Louise Yildirim, Marietta, GA (US)

(73) Assignee: LOULOU DESIGNS, INC., Marietta (AE)

( * ) Notice: Subject to any disclaimer, the term of this patent is extended or adjusted under 35 U.S.C. 154(b) by 0 days.

(21) Appl. No.: 15/059,859

(22) Filed: Mar. 3, 2016

(65) Prior Publication Data

US 2016/0257258 A1 Sep. 8, 2016

Related U.S. Application Data

(60) Provisional application No. 62/127,456, filed on Mar. 3, 2015.

(51) Int. Cl.
| | |
|---|---|
| *F16B 45/00* | (2006.01) |
| *B60R 7/04* | (2006.01) |
| *A45F 5/00* | (2006.01) |
| *A45F 5/02* | (2006.01) |
| *B60R 11/00* | (2006.01) |

(52) U.S. Cl.
CPC ............... B60R 7/043 (2013.01); A45F 5/00 (2013.01); A45F 5/021 (2013.01); *A45F 2005/006* (2013.01); *B60R 2011/0017* (2013.01)

(58) Field of Classification Search
USPC .......................................................... 248/304
See application file for complete search history.

(56) References Cited

U.S. PATENT DOCUMENTS

| | | | | |
|---|---|---|---|---|
| 94,448 | A * | 8/1869 | Simonson | A47C 7/62 16/94 R |
| 1,656,339 | A * | 1/1928 | Runyan | B60R 7/043 224/275 |
| 1,877,727 | A * | 9/1932 | McClarkey | B23K 3/08 248/303 |
| 2,932,544 | A * | 4/1960 | Lambert | B60N 3/004 108/135 |
| 5,361,956 | A * | 11/1994 | Recanati | A45F 5/00 224/257 |
| 5,458,301 | A * | 10/1995 | Cournoyer | B65B 67/1227 248/100 |
| 5,836,634 | A * | 11/1998 | Finkelman | A45F 5/1026 294/159 |
| D414,635 | S * | 10/1999 | Richter | D12/416 |
| 6,105,839 | A * | 8/2000 | Bell | B60N 3/004 220/6 |
| 6,220,489 | B1 * | 4/2001 | Sato | A47C 7/64 223/94 |
| D441,651 | S * | 5/2001 | Nygren | D9/434 |

(Continued)

*Primary Examiner* — Monica Millner
(74) *Attorney, Agent, or Firm* — Troutman Sanders LLP; Ryan A. Schneider; Andrew C. Doherty

(57) ABSTRACT

The disclosed technology includes an apparatus for holding, securing, storing or hanging items, particularly, from a headrest in an automobile. The apparatus may have a double-hook member for receiving items to store or hang. The apparatus may further have a chain or a strap that may be placed around a headrest in an automobile such that the apparatus may hang down the side of the chair.

18 Claims, 9 Drawing Sheets

(56) References Cited

U.S. PATENT DOCUMENTS

| | | | | |
|---|---|---|---|---|
| 6,260,750 | B1 * | 7/2001 | Chiang | B60R 7/10 224/275 |
| 6,439,443 | B1 * | 8/2002 | Liao | B60R 7/043 224/275 |
| 6,651,941 | B1 * | 11/2003 | Kinsel | A45F 5/1026 248/100 |
| 6,923,356 | B2 * | 8/2005 | Reynolds | A45F 3/14 224/254 |
| D514,319 | S * | 2/2006 | King | D3/328 |
| 7,204,468 | B2 * | 4/2007 | Kintzele | A47D 15/00 248/102 |
| 7,395,997 | B2 * | 7/2008 | Padden | B60N 2/4876 248/303 |
| 7,845,604 | B2 * | 12/2010 | Connor, Jr. | A47F 5/08 211/85.23 |
| 9,102,276 | B1 * | 8/2015 | Virgin | B60R 7/043 |
| 9,428,115 | B2 * | 8/2016 | Seifert | B60R 7/005 |
| 2008/0231063 | A1 * | 9/2008 | Bowers | B60R 7/043 296/1.07 |
| 2010/0264101 | A1 * | 10/2010 | Ma | A47G 29/083 211/85.15 |
| 2011/0101055 | A1 * | 5/2011 | O'Neill | B60R 7/043 224/275 |
| 2014/0084038 | A1 * | 3/2014 | Moles | A45F 5/00 224/607 |

* cited by examiner

ITEM-HOLDING DEVICE

CROSS REFERENCE TO RELATED APPLICATION

This application claims the benefit of U.S. Provisional Patent Application No. 62/127,456 filed Mar. 3, 2015, entitled "ITEM-HOLDING DEVICE," which is incorporated herein by reference as if set for herein in its entirety.

TECHNICAL FIELD

Aspects of the present disclosure relate to apparatuses for holding, hanging or securing items, and, more particularly, securely holding items such as purses, from the headrest of an automobile seat.

BACKGROUND

Automobiles are commonly used to transport personal items. However, due to the forces created by acceleration and deceleration, as well as centripetal or perceived centrifugal forces experienced during a turning motion of the vehicle, it is often desirable to have a way of securing items, to protect them from unwanted movement that may disturb, jostle, damage, or spill the contents of an item. Furthermore, there is a safety interest in securing items in a vehicle to prevent them from unexpectedly moving and causing injury to a passenger.

Various products and means of securing items in vehicles currently exist. Bags and boxes are commonly used to hold and secure items, although they are prone to sliding around and tipping over. Straps may be used to secure an item across the floor or wall of the vehicle, but they may be cumbersome to use, may not accommodate items of different shapes and sizes and the compressive forces exerted by a strap may serve to damage an item. As such, hanging or suspending an item over the floor of the vehicle may overcome the problems of sliding, tipping over, and damage caused by compressive forces that these other means are subject to.

There are various means for hanging or suspending items above the floor of a vehicle that are known in the art. One means may be a hanger attached to an internal hook of the vehicle, which may be useful for hanging or suspending clothes, but may not be used to secure a wide range of other objects. A typical car seat headrest may provide a convenient point to attach an apparatus for hanging or suspending an object. It is known to attach an apparatus with open-ended hooks to the backside of a headrest, to provide points to hang items from. However, open-ended hooks may only be suitable to hang items that have straps or handles. Furthermore, hanging an item from a single hook does not prevent the item from swinging back and forth during motion of the vehicle. Additionally, many such apparatuses providing hooks do not provide any mechanism to adjust the height of the hook, which further reduces the sizes of objects they are capable of accommodating. Lastly, an open-ended hook may be capable of impaling a passenger or poking them in the eye in the event of an abrupt stop of the vehicle, and therefore presents safety concerns as well.

Thus, it would be desirable to develop an improved apparatus for suspending, securing, holding or hanging items in a vehicle from a headrest, that can accommodate a wide range of objects, is safe, adjustable in height, and that substantially eliminates or minimizes the movement of the object relative to the vehicle.

BRIEF DESCRIPTION OF THE FIGURES

Reference will now be made to the accompanying figures, which are not necessarily drawn to scale, and wherein.

DETAILED DESCRIPTION

Figure 1:
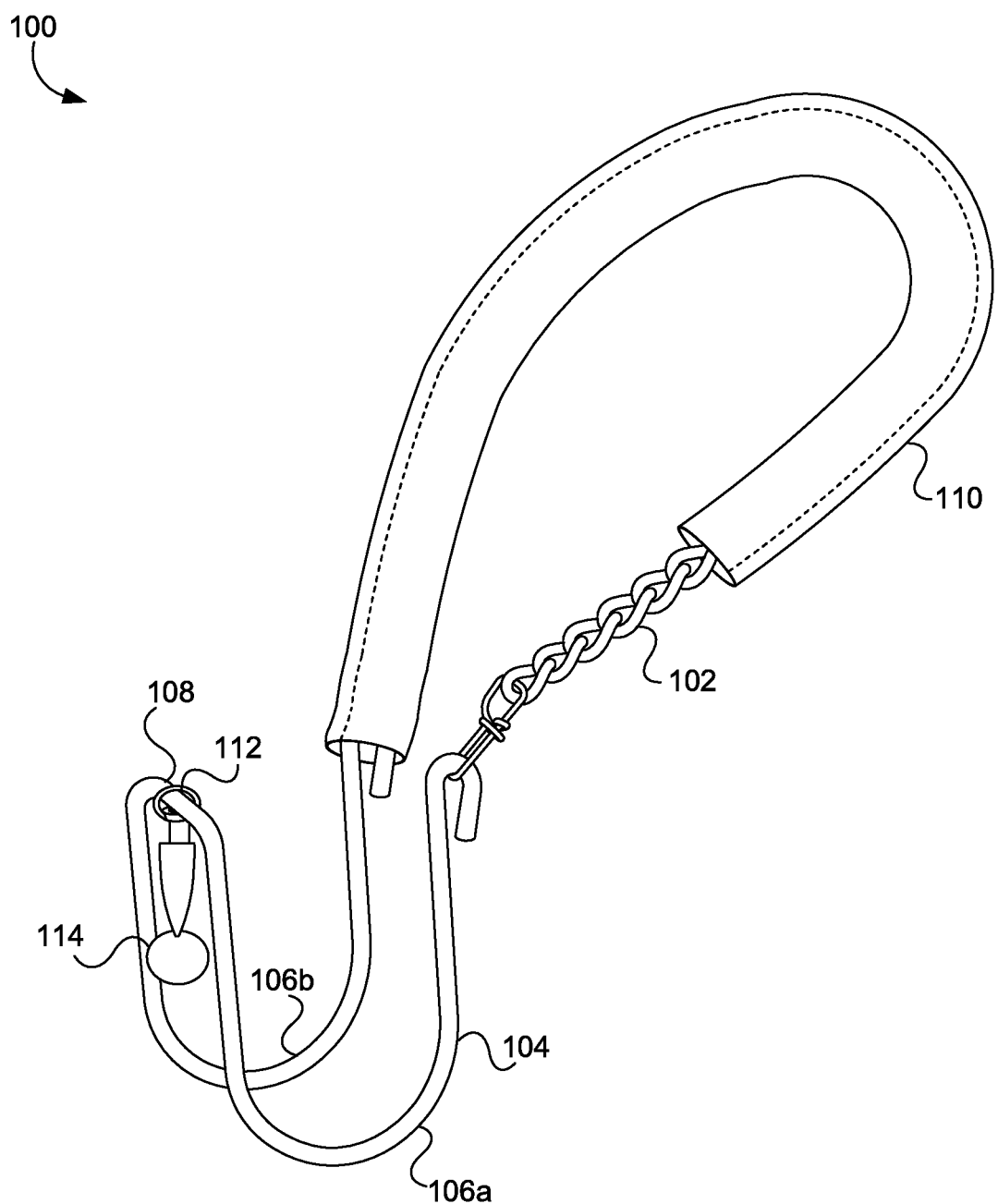
FIG. 1 is a perspective view of an item-holding device, according to an example embodiment.

The present disclosure can be understood more readily by reference to the following detailed description of exemplary embodiments and the examples included herein. Before the exemplary embodiments of the devices and methods according to the present disclosure are disclosed and described, it is to be understood that embodiments are not limited to those described within this disclosure. Numerous modifications and variations therein will be apparent to those skilled in the art and remain within the scope of the disclosure. It is also to be understood that the terminology used herein is for the purpose of describing specific embodiments only and is not intended to be limiting. Some embodiments of the disclosed technology will be described more fully hereinafter with reference to the accompanying drawings. This disclosed technology may, however, be embodied in many different forms and should not be construed as limited to the embodiments set forth therein.

In the following description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Also, in describing the example embodiments, terminology will be resorted to for the sake of clarity. It is intended that each term contemplates its broadest meaning as understood by those skilled in the art and includes all technical equivalents that operate in a similar manner to accomplish a similar purpose.

To facilitate an understanding of the principles and features of the embodiments of the present disclosure, exemplary embodiments are explained hereinafter with reference to their implementation in an illustrative embodiment. Such illustrative embodiments are not, however, intended to be limiting.

The materials described hereinafter as making up the various elements of the embodiments of the present disclosure are intended to be illustrative and not restrictive. Many suitable materials that would perform the same or a similar function as the materials described herein are intended to be embraced within the scope of the example embodiments. Such other materials not described herein can include, but are not limited to, materials that are developed after the time of the development of the invention, for example.

Embodiments of the disclosed technology include an item-holding device for holding, storing, securing or hanging items in an automobile. In various embodiments, an item-holding device may be attachable to the headrest of a seat. An item-holding device may be shaped to hold, secure or hang items of various shapes and sizes, including, but not limited to, handbags, purses, briefcases, bags, backpacks, thermoses, diaper bags, baskets, sporting bags, grocery bags, and a wide array of other items that are commonly transported in an automobile. The item-holding device may be adjustable to hang at different heights, for example, against the back of a car seat, according to some embodiments.

Throughout this disclosure, certain embodiments are described in exemplary fashion in relation to being mounted to the back of a car seat headrest, to hold an item, such as a purse. However, embodiments of the disclosed technology are not so limited. In some embodiments, the disclosed technique may be effective in holding items when attached to or mounted on other objects, such as chairs, walls, doors, banisters, or any other support structure in which it may be desirable to provide a place to hold, store, hang or secure an item.

Figure 2:
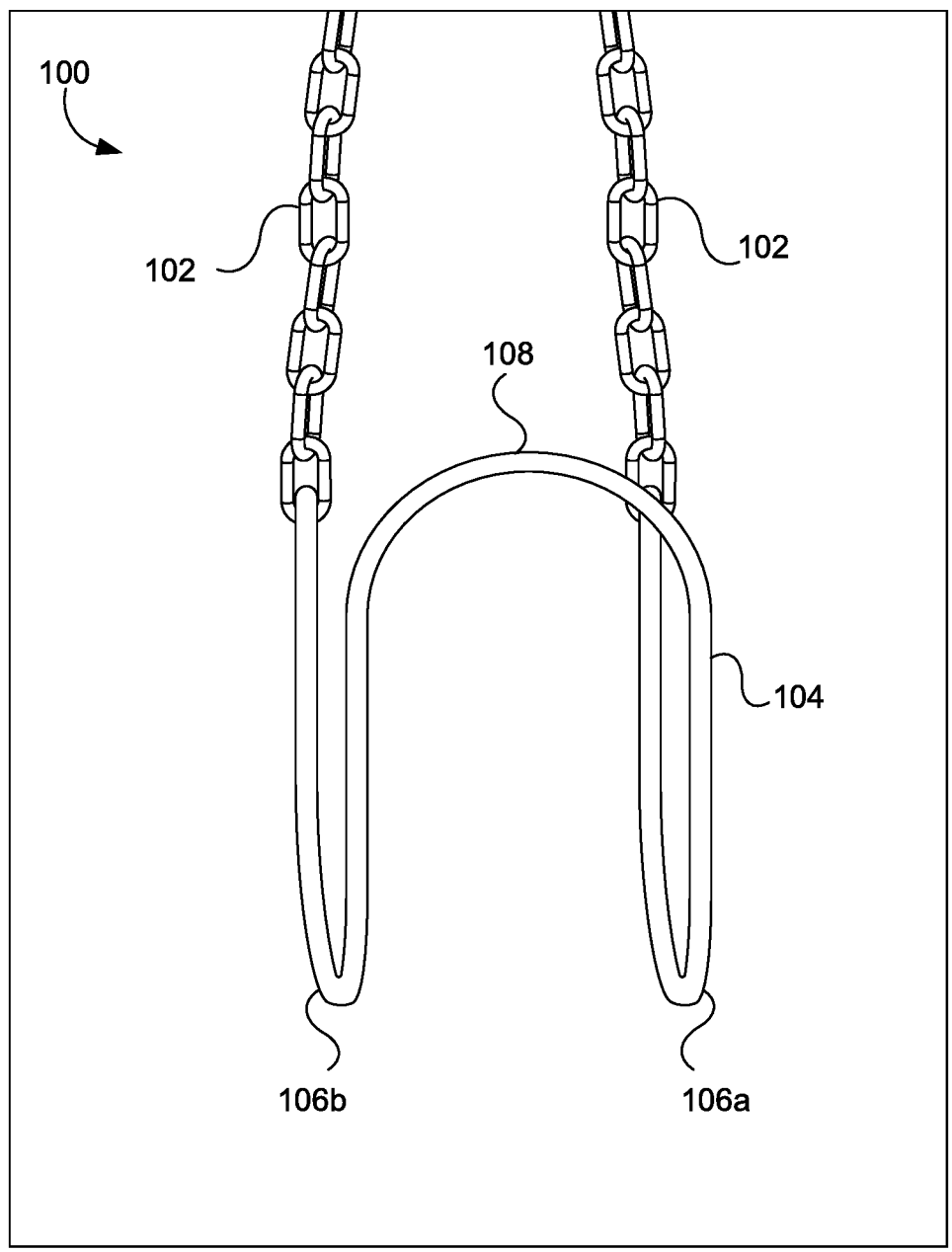
FIG. 2 is a front view of an item-holding device, according to an example embodiment.

Referring now to the drawings, FIGS. 1 illustrates an example embodiment of an item-holding device 100. In some embodiments, an item-holding device 100 may comprise an attachment member 102 coupled to a holding member 104. According to embodiments of the present disclosure, an attachment member 102 may serve to attach or couple the item-holding device 100 to a support structure (e.g., a headrest). In various embodiments, the attachment member 102 may comprise a flexible member with a first end and a second end. The embodiments shown in FIGS. 1 and 2 depict an attachment member 102 comprising a chain. However, it should be appreciated by those of skill in the art that an attachment member 102 may comprise a chain, a strap, a belt, a rope, a cord, or any other type of material that is flexible and/or adjustable, yet capable of bearing a load. An attachment member 102 may be comprised of one or more pieces of material comprising metal, patent leather, leather, fabric, vinyl, rope, rubber, plastic, or other suitable materials. An attachment member 102 may serve to attach or mount the item-holding device 100 to a support structure, such as, for example, a headrest of a car seat. In one embodiment, the attachment member 102 may serve to couple the item-holding device 100 to a headrest by wrapping around one or more supporting poles of the headrest. Although this description is generally directed towards use of an item-holding device 100 with the headrest of a car seat, it should be understood that use of an item-holding device is not so restricted and may be used with headrests of chairs in airplanes, trains, buses, and free standing chairs, as well as any other suitable support structure.

In various embodiments, the attachment member 102 may be partially or wholly contained within a sleeve member 110, as shown in FIG. 1. In some embodiments, a sleeve member 110 placed around the outside of the attachment member 102 may serve to protect the support structure (e.g., a headrest) from the item-holding device 100. A sleeve member 110 may be comprised of a piece of fabric. The fabric may be any type of known fabric that is suitable to protect the surface of a support structure (e.g., a car seat) from damage that might occur from friction caused by the attachment member 102 rubbing against the support structure during movement of the item-holding device 100. In some embodiments, the sleeve member 110 may be comprised of a first piece of material defining the interior of the sleeve member 110 coupled to a second piece of material defining the exterior of the sleeve member 110. In some embodiments the first piece of material may be made of material that has characteristics that are conducive to reducing or resisting chaffing caused by the attachment member 102. In some embodiments the second piece of material may be made of material that is designed to be aesthetically pleasing or decorative.

According to embodiments of the present disclosure, a holding member 104 may be operable to receive an item for temporary storage. Furthermore, a holding member 104 may be operable to receive a portion of an item (e.g., a strap of a purse), for hanging the item. In various embodiments, the holding member 104 may comprise a rigid member with a first end and a second end. In various embodiments, a holding member 104 may comprise a first and second substantially parallel "U" shapes 106a, 106b that are connected to form one continuous apparatus. Although this disclosure is described with respect to a pair of "U" shapes 106a, 106b, it should be understood that a variety of shapes creating a concave surface for receiving an item may be used. Each "U" shape 106a, 106b may have a front vertical arm and a rear vertical arm, corresponding to the two straight portions of the "U" shape. In one embodiment, the front vertical arm the first "U" shape 106a may be connected to the front vertical arm of the second "U" shape 106b via a bridge member 108 as shown in FIG. 1, forming one continuous shape. As shown in FIG. 2, according to some embodiments, the bridge member 108 may be rounded. The space contained within the continuous shape of the holding member 104 may be referred to as the holding member cavity. In various embodiments, items may be placed within the holding member cavity for storage.

A bridge member 108 connecting the front vertical arms of the two "U" shapes 106a, 106b of the holding member 104 may also be referred to as the bridge portion of the holding member 104. Furthermore, a form comprising two generally "U" shaped members 106a, 106b connected at one end of each "U" by a bridge member 108 may be referred to herein as a "double hook" shape. In some embodiments, a bridge member 108 of the holding member 104 may comprise a rounded shape as shown in FIGS. 1 and 2.

Figure 3:
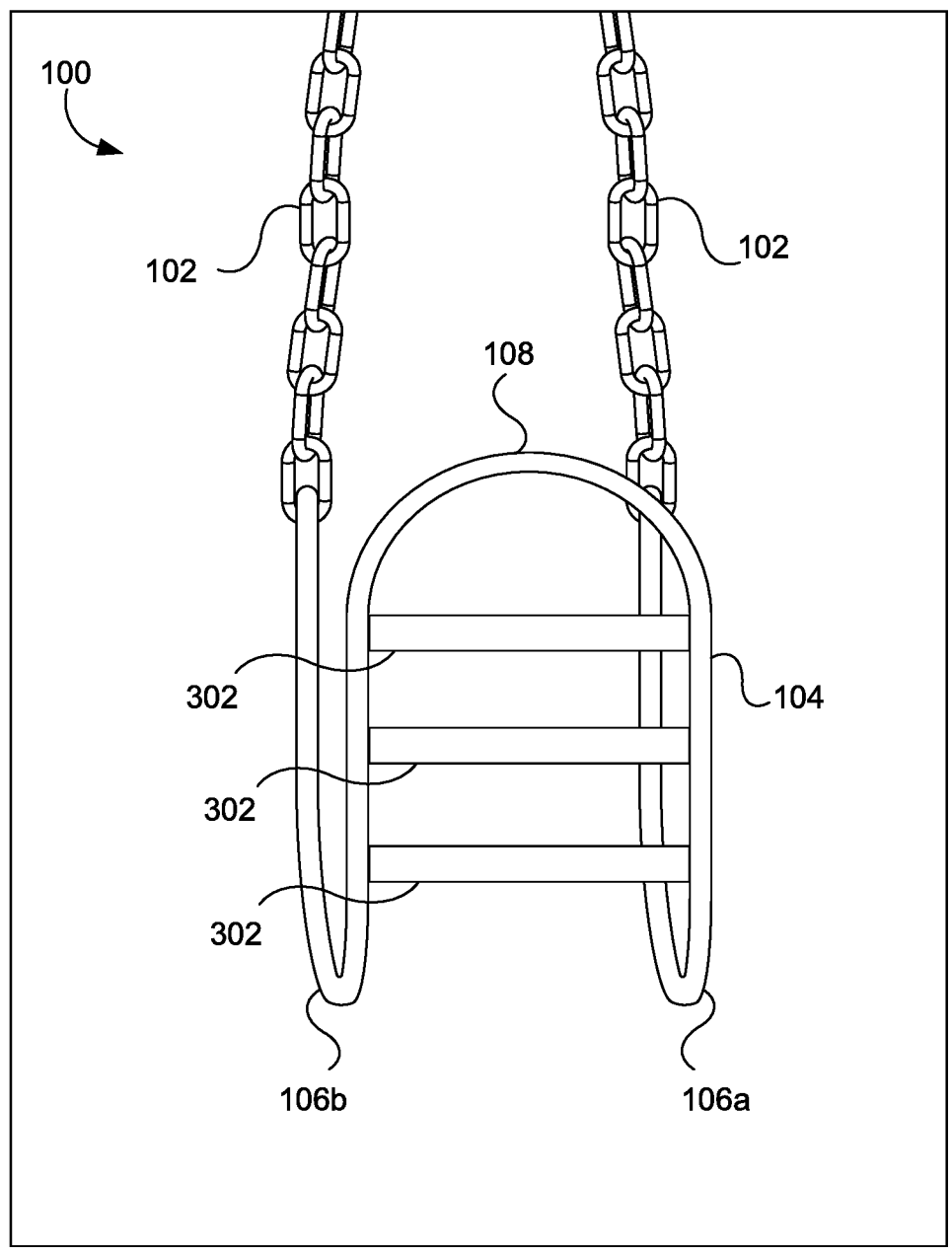
FIG. 3 is a perspective view of an item-holding device having bridge support members, according to an example embodiment.

As shown in FIG. 3, in some embodiments, the two "U" shapes of the double hook shape may be connected by a plurality of bridge support members 302. Each bridge support member 302 of the plurality may be connected at a first end at a point on the first "U" shape and at a second end at a point on the second "U" shape. In some embodiments, the plurality of bridge support members 302 may intersect with each "U" shape at a perpendicular angle. In other embodiments, bridge support members 302 may connect to each "U" shape at acute or obtuse angles. Further, in some embodiments, bridge support members 302 may intersect with one another forming, for example, a crosshatching pattern. Bridge support members 302 may serve to provide stability to the holding member 104 and provide additional support for holding objects. For example, a bridge support member 302 connecting across the bottom portions the "U" shapes may provide additional support for objects placed within a double hook shaped holding member 104. In other embodiments, a holding member 104 may provide one or more hook members protruding from points on the first or second "U" shape, bridge member 108, or bridge support members 302. A hook member may comprise a hook-shaped protrusion that may be operable to receive a portion of an item for hanging (e.g., a strap, string, or any other suitable portion of an item typically used for hanging).

Figure 4A:
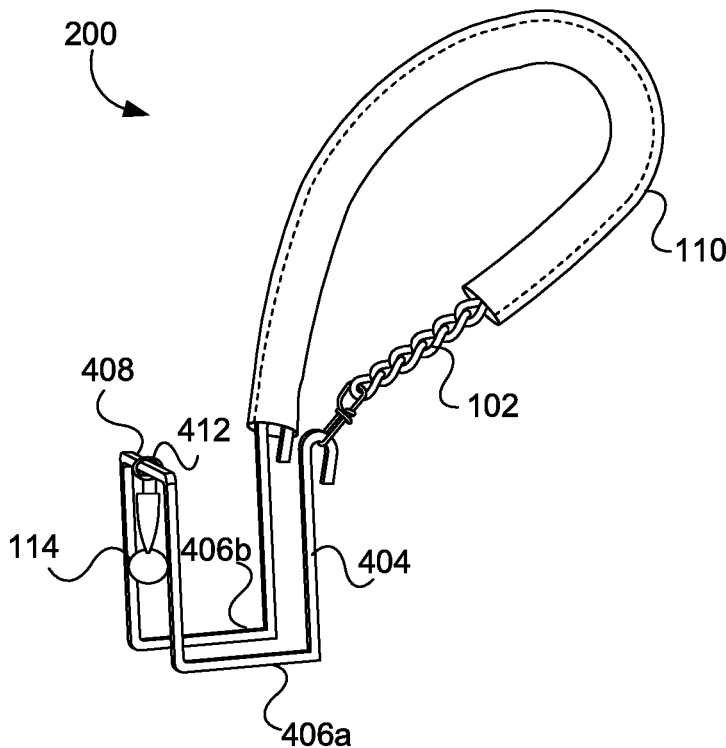
FIGS. 4A-B are views of an item-holding device having a squared holding member, according to an example embodiment.
Figure 4B:
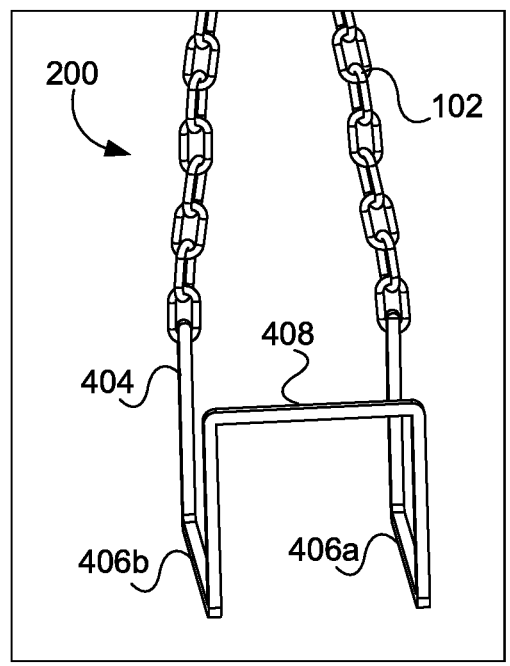

As shown in FIGS. 4A-B, in some embodiments a bridge member 108 and holding member 104 may have squared edges instead of rounded edges. As shown in FIGS. 4A-B, a squared holding member 404 may have a first and second substantially parallel squared "U" shapes 406a, 406b, wherein each "U" shape 406a, 406b is formed with two approximately 90 degree angles. The two substantially parallel squared "U" shapes 406a, 406b may be joined by a squared bridge member 408, thereby forming approximately 90 degree angles between the squared bridge member 408 and the squared "U" shapes 406a, 406b.

According to some embodiments, a holding member 104 may be comprised of a single piece of wire. In some embodiments, a holding member 104 may be comprised of multiple pieces of wire, connected together. It should be appreciated by those skilled in the art that a holding member 104 may be comprised of many variations of the "double hook" shape shown in FIG. 1. Furthermore, in various embodiments, a holding member 104 may be comprised of various materials, such as, but not limited to, metals, alloys, and plastics.

As described above, an attachment member 102 of the present disclosure may comprise a flexible member with a first end and a second end, and a holding member 104 may comprise rigid member with a first end and a second end. In various embodiments, a first end of the attachment member 102 may be coupled to a first end of the holding member 104, and a second end of the attachment member 102 may be coupled to a second end of the holding member 104. In one embodiment, the first and second end of the holding member 104 may each form a closed loop that connects to each end of the attachment member 102 in the fashion of a chain-link, as shown in FIG. 1. According to another embodiment, each end of the attachment member 102 may loop through the closed loop of each end of the holding member 104 and be secured by, for example, being tied in a knot, or being secured by a securing member. A securing member may comprise a piece of material that is secured tightly around a portion of the attachment member 102 via compression forces (for example, a piece of elastic material), such that an end of the attachment member 102 that has been looped through the end of the holding member 104 may be secured underneath the securing member by pressing the folded portion of the attachment member 102 end tightly together.

Figure 5:
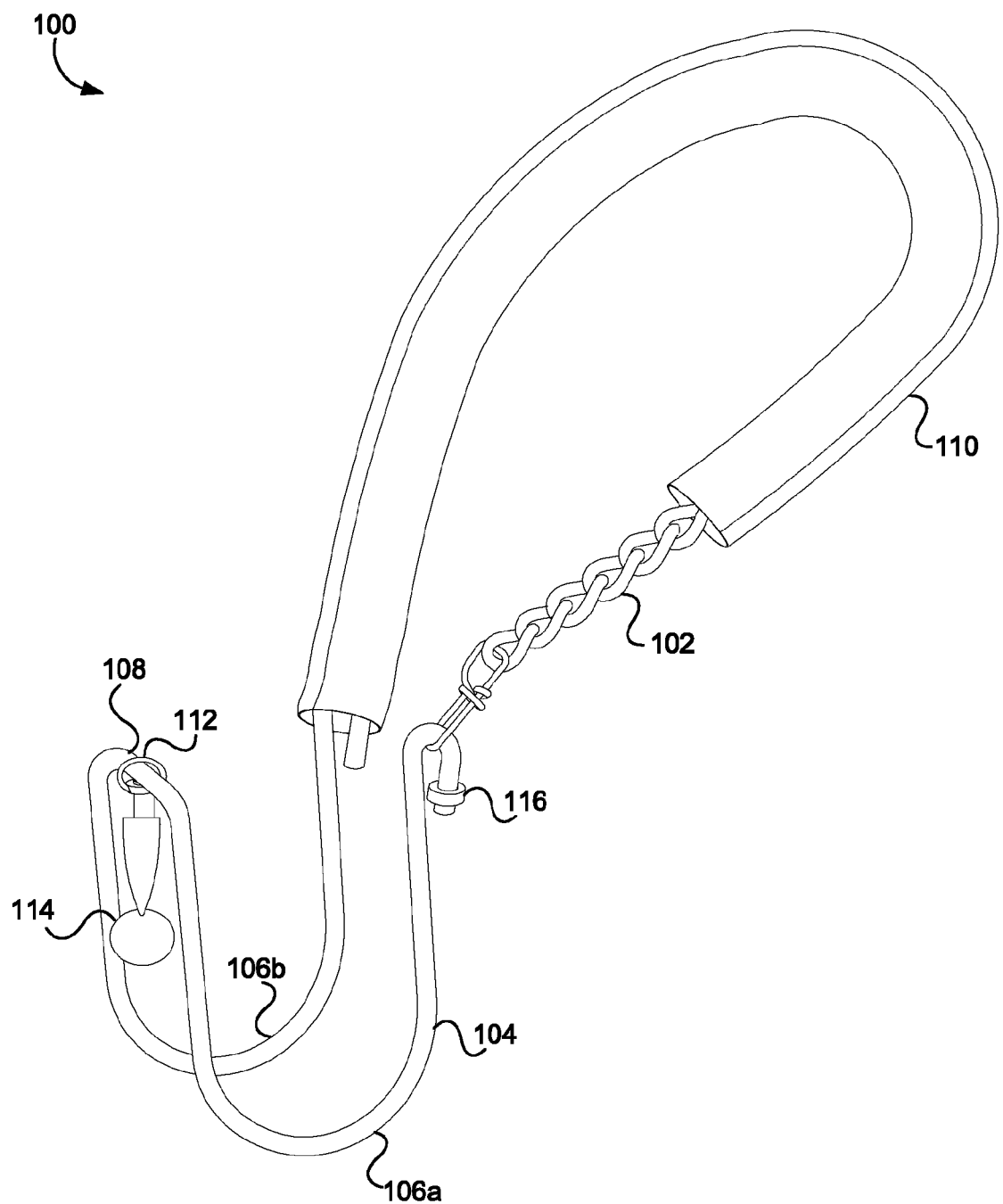
FIG. 5 is a perspective view of an item-holding device, according to an example embodiment.

In some embodiments, one or both ends of the attachment member 102 may be removably coupled to the ends of the holding member 104. Detaching an end of the attachment member 102 from the end of the holding member 104 may enable a user to adjust the length of the attachment member that is present between the two ends of the holding member, by, for example, reattaching the end of the attachment member 102 to the end of the holding member 104 at a different point in the attachment member (e.g., at a different link in the chain). This may allow a user to adjust the height at which the holding member 104 hangs from a support structure 700 and may also allow the user to adjust the tension of the attachment member 102. According to some embodiments, one or both of the ends of the holding member 104 may form a loop with a partial gap, such that the end of the attachment member 102 may be free to detach by sliding out of the loop. In such cases, a detachable end of the attachment member 102 may be secured to an end of a holding member 104 by attaching an end cap 116 to the end of the holding member 104 after the end of the attachment member has been hooked around the partially open loop, as shown in FIG. 5. The end cap 116 may obstruct or fill the partially open portion of the loop, thereby preventing the end of the attachment member 102 from sliding out of the loop. An end cap may be a nut, a washer, a stopper, or any other part that is suitable to removeably attach to the end of the holding member 104 and substantially close the partial opening of the loop.

In some embodiments, the attachment member 102 may comprise a belt having one or more apertures at the first and/or second end of the attachment member 102, in which the first and/or second end of the holding member 104 may be coupled. For example, one or more ends of the holding member 104 may comprise a buckle that may interface with an aperture to couple the holding member 104 to the attachment member 102. As previously described, in various embodiments, the attachment member 102 may comprise a number of different forms and materials, and it should be understand by those with skill in the art that there may be a variety of ways in which to couple each end of the holding member 104 to each end of the attachment member 102.

In some embodiments, the attachment member 102 may be adjustable in length, such that the height at which the holding member 104 is positioned (relative to, for example, the floor of a vehicle) may be adjusted. Adjusting the height of the holding member 104 may allow a user to create more space above or below the item-holding device 100, which may allow the item-holding device 100 to better accommodate items within the holding member 104 or hanging from the holding member 104. Providing the ability to adjust the height of the item-holding device 100 may also better accommodate items stowed below the item-holding device 100, for example, on the floor of an automobile. In some embodiments, the attachment member 102 may comprise chain links. The length of the attachment member 102 may be adjusted by adding or removing links from the chain. In some embodiments, the height of the item-holding device 100 may also be adjusted by decoupling the holding member 104 from one chain link and coupling it to a different chain link.

Figure 6A:
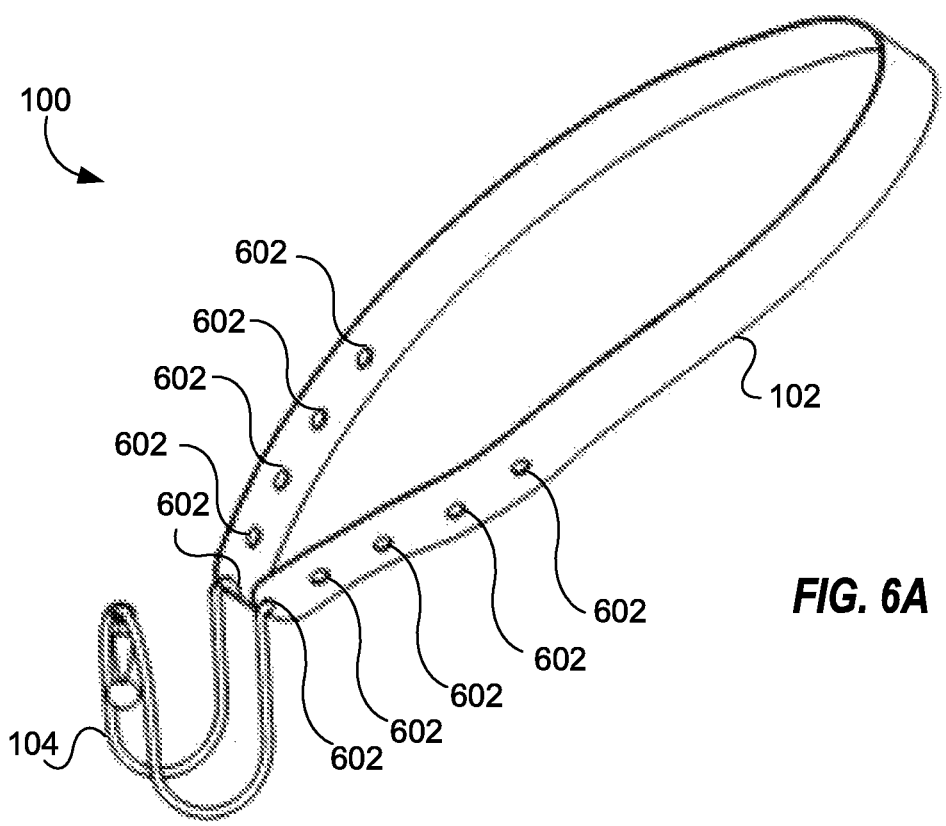
FIGS. 6A-B are perspective views of an item-holding device wherein the attachment member is a belt, according to example embodiments.
Figure 6B:
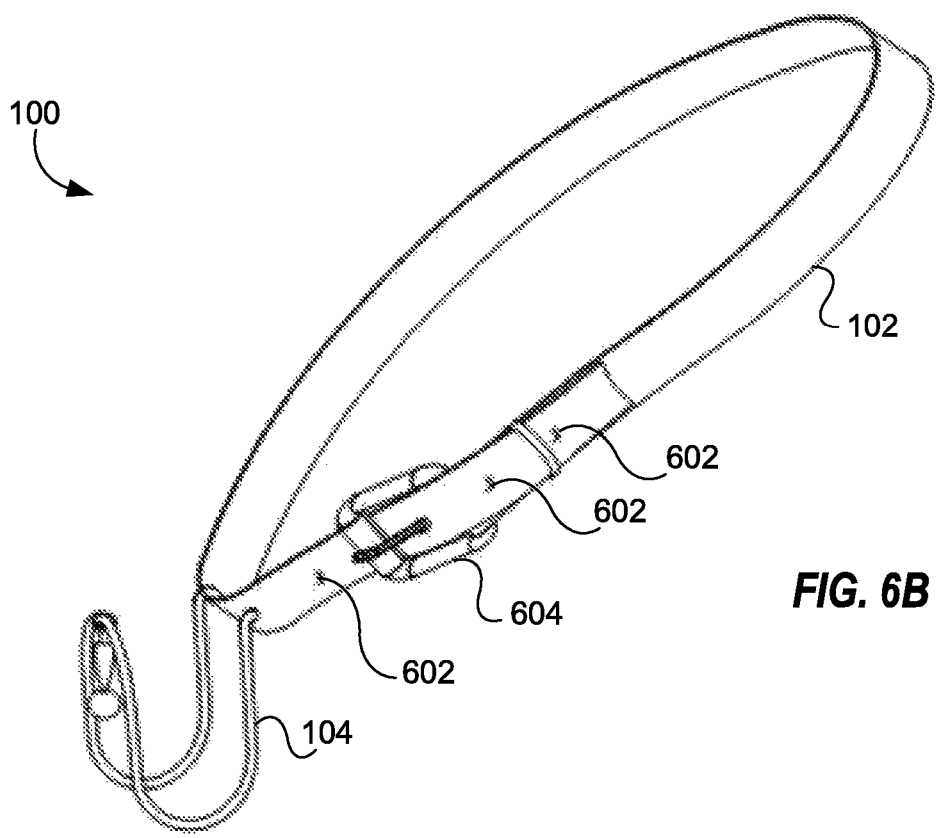

As shown in FIGS. 6A-B, in some embodiments the attachment member 102 may be a strap or a belt having one or more apertures 602. The attachment member 102 may couple to the holding member 104 by inserting an end of the holding member 104 through an aperture 602 of the attachment member. The length and/or tension of the attachment member may be adjusted by inserting the end of the holding member 104 into a different aperture 602 of the attachment member 102. As shown in FIG. 6B, in some embodiments, the attachment member 102 may be a belt that is coupled to each end of the holding member 104, and the length and/or tension of the attachment member may be manually adjusted and fixed in place by use of a buckle 604. In some embodiments, the attachment member 102 may comprise a leather strap that may be coupled to the holding member 104 by looping the strap through an end of the holding member 104, folding over on itself and being secured together by a securing member. The height of the item-holding device 100 may be adjusted by adjusting the length of the end of the attachment member 102 that is looped through the end of the holding member 104, folded back on itself and secured with a securing member. As will be appreciated by those of skill in the art, there may be many other means of adjusting the height of the item-holding device 100 based on the design and composition of the holding member 104 and attachment member 102.

Figure 7A:
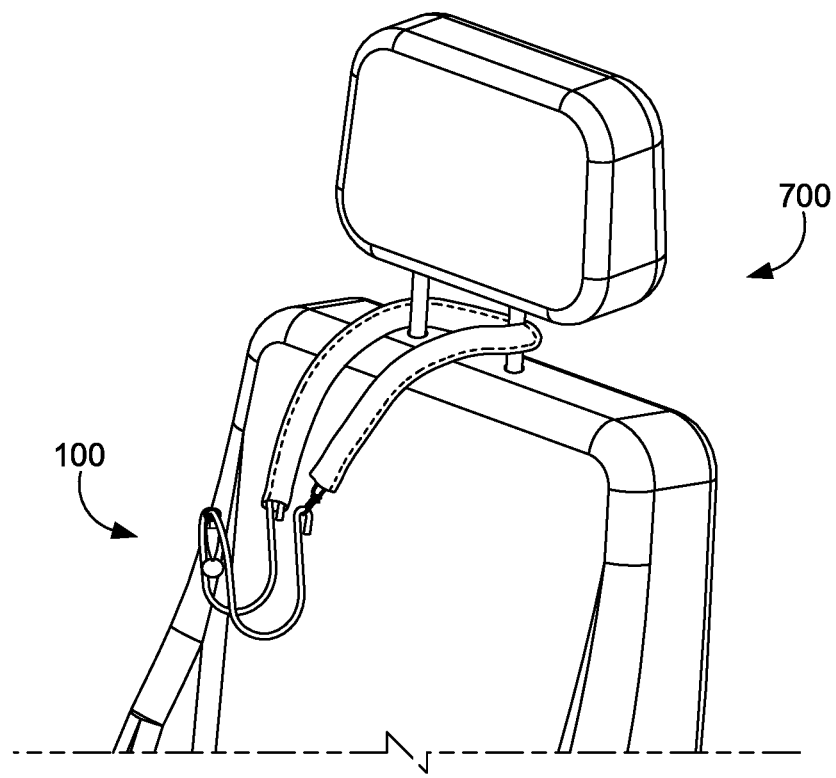
FIGS. 7A-B are perspective views of an item-holding device coupled to a head-rest of a car seat, according to example embodiments.
Figure 7B:
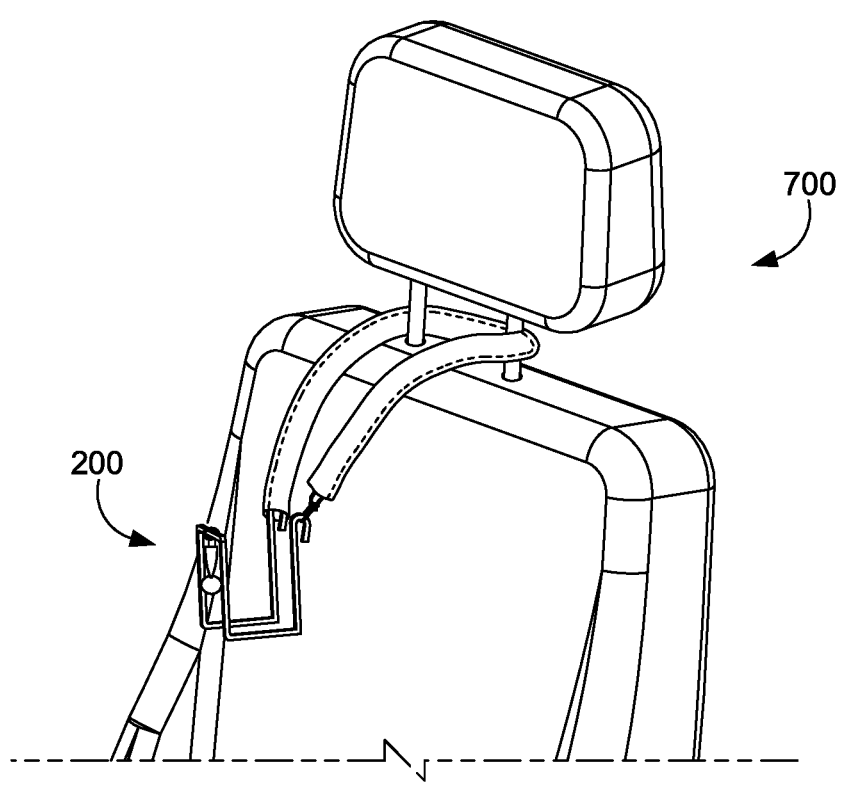
Figure 8A:
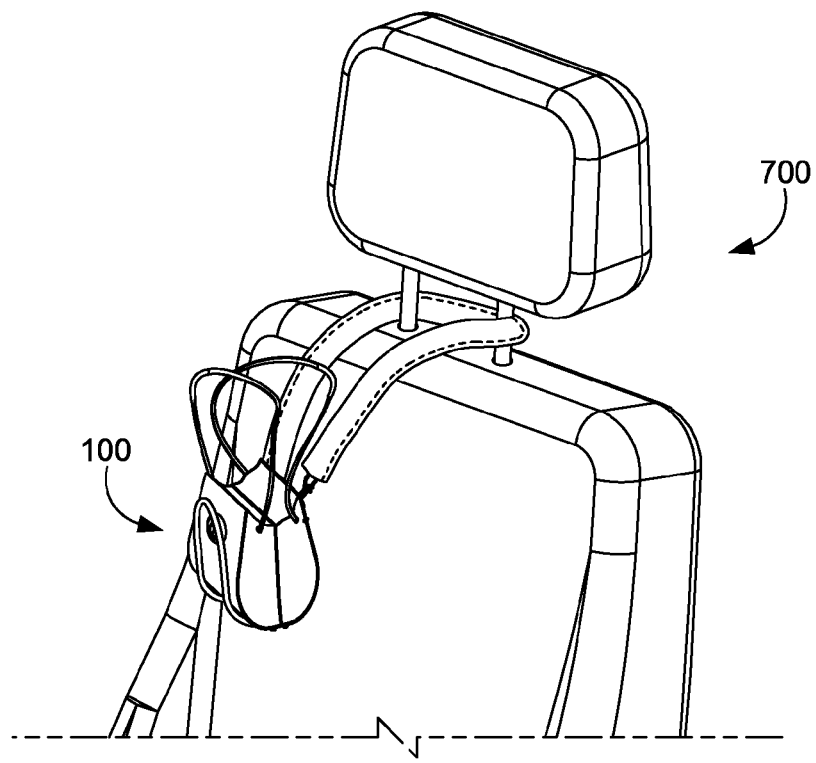
FIG. 8A-B are perspective views of an item-holding device in use, according to example embodiments.

As shown in FIGS. 7A-B, an item-holding device 100 may be attached to a support structure 700 by wrapping the attachment member 102 around a portion of the support structure. For example, the attachment member 102 may be wrapped around a headrest in a car such that the holding member dangles below. The item-holding device 100 may receive and secure items through at least two methods—holding and hanging. In various embodiments, the item-holding device 100 may hold an item in place by receiving the item in the holding member cavity, as shown in FIG. 8A. For example, in one embodiment, a purse may be placed into the holding member 104 such that the bottom of the purse rests on the bottom of each "U" shape. In this way, the vertical arms may serve to secure the purse by providing front and rear stability. The holding member 104 may be capable of holding a variety of items such as, but not limited to, an adjustable handbag, a briefcase, a bag, a backpack, a thermos, a basket, a sporting bag, or a diaper bag, just to name a few. In various embodiments, a large holding member cavity created by the double-hooks of the holding member 104 may allow a user to store a variety of handbag sizes and weights, which may be held in place easily and effortlessly. In various embodiments, the "U" shapes of the holding member 104 may be tapered such that space between each vertical arm gets smaller the as it nears the bottom of the "U" shape. In other embodiments, the space between the vertical arms of the "U" shapes may remain substantially the same until the bottom of the "U" shape.

Figure 8B:
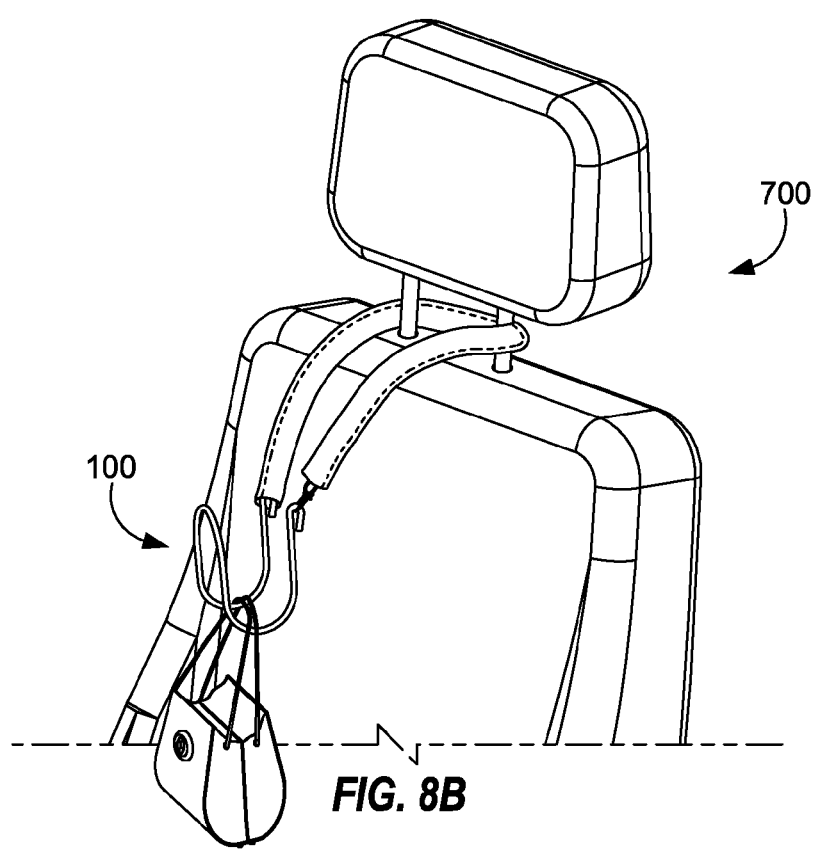

The item-holding device 100 may also receive hanging items. For example, the item-holding device 100 may receive a strap of an item across the top portions of the bottom of the "U" shapes, as shown in FIG. 8B. Furthermore, the items of clothing may be draped across the vertically extending front portion of the holding member 104. As previously described, in some embodiments the holding member 104 may provide one or more hooks, from which items may also be hung.

Figure 9:
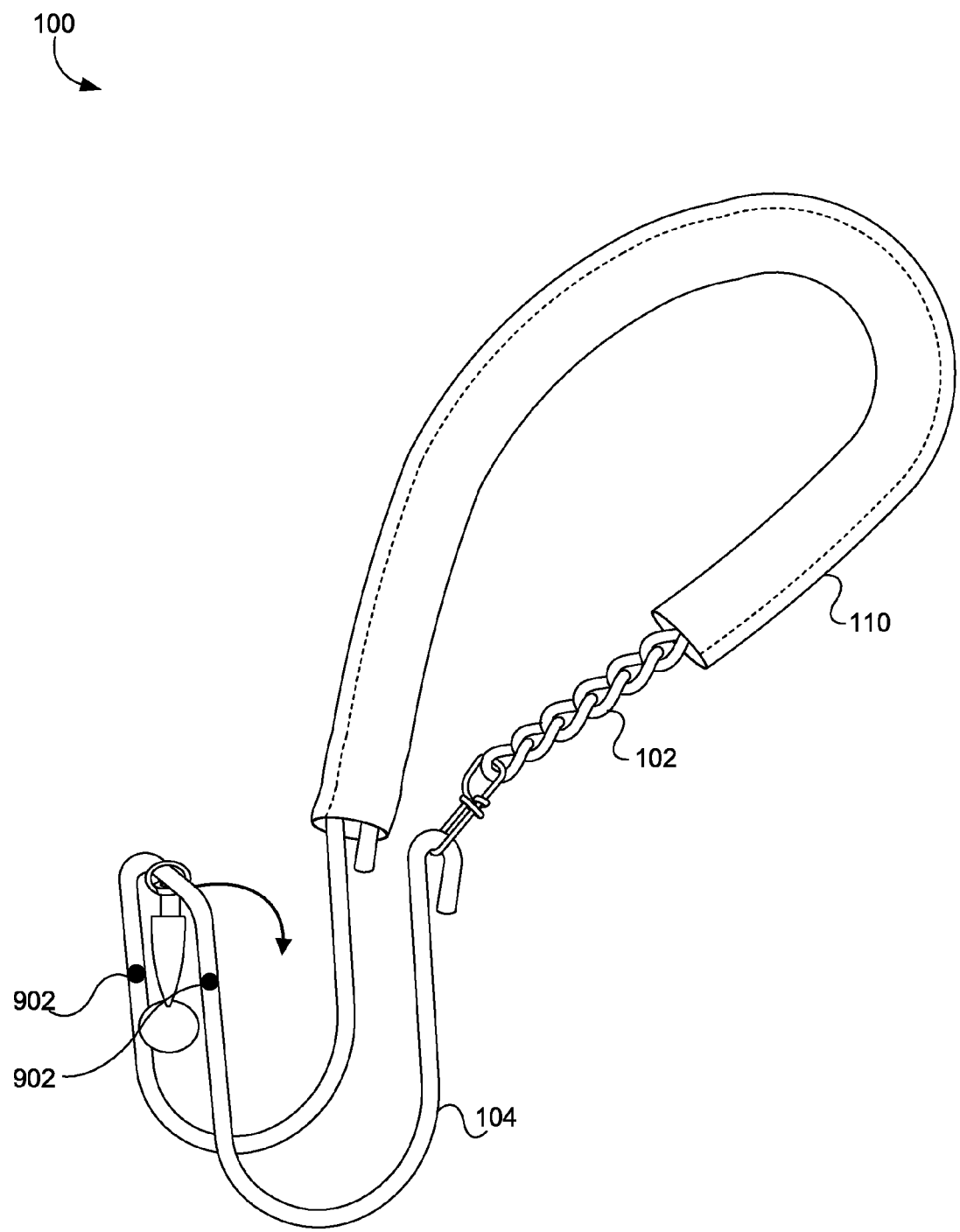
FIG. 9 is a perspective view of an item-holding device showing rotation of an upper portion of the holding member, according to an example embodiment.

In some embodiments, the holding member 104 may comprise a semi-rigid material, such that portions of the holding member 104 may bend and retain their bended shape, such that an item may be placed in the holding member 104 as previously described, and then further secured by, for example, bending the portion of the top portion of holding member 104 comprising the bridge member 108 towards the rear vertical members to close off the top of the holding member cavity. For example, as shown in FIG. 9, a top portion of the holding member 104 may bend towards the holding member cavity at two rotation points 902. According to some embodiments, rotation points may be a portion of the holding member that is made of a bendable material. In some embodiments, rotation points may be hinges. In such embodiments, bending the top portion of the holding member 104 over may substantially impede an item resting in the holding member 104 from vertically exiting the holding member 104, in the event of, for example, a vehicle hitting a sudden bump in the road. In various embodiments, the holding member 104 may comprise a material of varying degrees of rigidity, such that in each embodiment a different level of force may be required to bend the holding member 104.

In some embodiments, decorative element 114 may be coupled to the holding member 104. A decorative element 114 may comprise a hanging charm. According to some embodiments, a hanging charm may be interchangeable with other hanging charms, such that a user may replace one hanging charm with another at will. In one embodiment, the hanging charm may be coupled to the holding member 104 at the middle of a bridge member 108 that connects the first and second vertical arms of the "U" shapes, such that it hangs in the front center portion of the holding member 104. In other embodiments, one or more hanging charms may be coupled to the various points of the holding member 104 or bridge support members 302. A hanging charm may be coupled to the holding member 104, bridge member 108, or bridge support members 302 by a any conventional means, such as, for example but not limited to, a clasp, a lobster clasp, a hook, a tie, a karabiner, or any other suitable means. In some embodiments, a hanging charm may be secured to a bridge portion of the holding member 104 by a clasp member 112. For example, a clasp member 112 may be a lobster clasp, wherein the lobster clasp is secured in place on the bridge portion of the holding member 104 by one or more stabilizing members. In one embodiment, the one or more stabilizing members comprise two pieces of plastic tubing. There are many possible means for coupling a hanging charm to the bridge portion of the holding member 104 that are well known by those of skill in the art.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An item-holding device comprising:
   an attachment member having a first end and a second end; and
   a holding member comprising:
     a first end comprising a first loop, the first end of the holding member coupled to the attachment member at the first end of the attachment member by the first end of the attachment member being positioned within the first loop;
     a second end comprising a second loop, the second end of the holding member coupled to the attachment member at the second end of the attachment member by the second end of the attachment member being positioned within the second loop; and
     two substantially parallel U-shaped members, each U-shaped member comprising a rear vertical arm having a top end and a front vertical arm having a top end, the top end of the rear vertical arm and the top end of the front vertical arm on opposing sides of each U-shaped member, wherein:
       the top end of a first rear vertical arm adjoins the first end of the holding member and the top end of a second rear vertical arm adjoins the second end of the holding member; and
       the top end of a first front vertical arm is joined to the top end of a second front vertical arm by a bridge member, such that the bridge member is positioned opposite the first and second ends of the holding member.

2. The item-holding device of claim 1, further comprising a sleeve member, wherein the attachment member is partially contained within the sleeve member.

3. The item-holding device of claim 2, wherein the sleeve member is fabric.

4. The item-holding device of claim 1, wherein the attachment member is a chain or a belt.

5. The item-holding device of claim 1, wherein the length of the attachment member is adjustable.

6. The item-holding device of claim 1, wherein the second end of the attachment member is detachably attached to the second end of the holding member.

7. The item-holding device of claim 1, wherein the at least one of the first end of the holding member and the second end of the holding member forms a closed loop.

8. The item-holding device of claim 1, wherein at least one of the first end of the holding member and the second end of the holding member forms a partially open loop.

9. The item-holding device of claim 8, further comprising a removable end cap attached to the at least one of the first end of the holding member and the second end of the holding member to obstruct an opening of the partially open loop enough to prevent the respective end of the attachment member from detaching from the at least of the first end of the holding member and the second end of the holding member.

10. The item-holding device of claim 1, wherein the attachment member comprises a belt of adjustable length that can be fixed in place with a buckle.

11. The item-holding device of claim 1, wherein the U-shaped members are rounded.

12. The item-holding device of claim 1, wherein the U-shaped members are squared.

13. The item-holding device of claim 1, further comprising a clasp member coupled to the bridge member, wherein the clasp member is operative to allow a decorative element to be detachably attached to the item-holding device.

14. The item-holding device of claim 1, further comprising one or more bridge support members, wherein each bridge support member is connected approximately perpendicularly to each of the two substantially parallel U-shaped members such that the bridge member extends across the gap formed between the two substantially parallel U-shaped members.

15. The item-holding device of claim 1, wherein an upper portion of the holding member is enabled to rotate towards a holding member cavity.

16. A method of holding an item using an item-holding device, comprising:
   wrapping an attachment member of an item-holding device around a headrest of a car seat, the attachment member having a first end and a second end;
   positioning a holding member that is coupled to the attachment member such that it hangs below the attachment member, wherein the holding member comprises:
     a first end comprising a first loop, the first end of the holding member coupled to the attachment member at the first end of the attachment member by the first end of the attachment member being positioned within the first loop;
     a second end comprising a second loop, the second end of the holding member coupled to the attachment member at the second end of the attachment member by the second end of the attachment member being positioned within the second loop; and
     two substantially parallel U-shaped members, each U-shaped member comprising a rear vertical arm having a top end and a front vertical arm having a top end, the top end of the rear vertical arm and the top end of the front vertical arm on opposing sides of each U-shaped member, wherein:
       the top end of a first rear vertical arm adjoins the first end of the holding member and the top end of a second rear vertical arm adjoins the second end of the holding member; and
       the top end of a first front vertical arm is joined to the top end of a second front vertical arm by a bridge member, such that the bridge member is positioned opposite the first and second ends of the holding member; and
   placing an item in a cavity formed by the holding member.

17. The method of holding an item using an item-holding device of claim 16, wherein the holding member is positioned against the side of the car seat.

18. The method of holding an item using an item-holding device of claim 16, further comprising rotating an upper portion of the holding member towards the cavity such that it prevents the item from being vertically removed from the holding member.

* * * * *